United States Patent
Al-Otaibi

(10) Patent No.: US 12,345,141 B2
(45) Date of Patent: Jul. 1, 2025

(54) WATERFLOODING SYSTEM AND PROCESS TO PREVENT SCALE PRECIPITATION IN OIL FIELDS

(71) Applicant: SAUDI ARABIAN OIL COMPANY, Dhahran (SA)

(72) Inventor: Mohammed Badri Al-Otaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/462,805

(22) Filed: Sep. 7, 2023

(65) Prior Publication Data

US 2025/0084739 A1    Mar. 13, 2025

(51) Int. Cl.
*E21B 43/20* (2006.01)
*B01D 61/02* (2006.01)

(52) U.S. Cl.
CPC ............ *E21B 43/20* (2013.01); *B01D 61/025* (2013.01)

(58) Field of Classification Search
CPC ........ E21B 43/20; E21B 43/16; E21B 43/385; B01D 61/025
See application file for complete search history.

(56) References Cited

U.S. PATENT DOCUMENTS

| | | | | |
|---|---|---|---|---|
| 2012/0125604 A1* | 5/2012 | Willingham | ............ | E21B 43/20 166/270.1 |
| 2019/0060834 A1* | 2/2019 | Katz | ............ | B01D 61/10 |
| 2019/0367801 A1* | 12/2019 | Al-Otaibi | ............ | C09K 8/588 |
| 2020/0230554 A1 | 7/2020 | Collins et al. | | |
| 2020/0248514 A1 | 8/2020 | Collins et al. | | |
| 2021/0215030 A1* | 7/2021 | Day | ............ | E21B 43/35 |
| 2021/0247661 A1* | 8/2021 | Cha | ............ | G01N 33/2823 |
| 2022/0213769 A1* | 7/2022 | Al-Otaibi | ............ | E21B 43/20 |
| 2022/0314167 A1 | 10/2022 | Antonopoulos et al. | | |

FOREIGN PATENT DOCUMENTS

EP    4045462 A1    8/2022

OTHER PUBLICATIONS

Heatherly et al., "Sulfate Removal Technology for Seawater Waterflood Injection," Offshore Technology Conference, OTC 7593, May 1994, 18 pages.
Khormali and Petrakov, "A Comprehensive Study on Prediction and Inhibition of Calcium Sulfate Scale Formation in Oil Reservoirs," European Association of Geoscientists & Engineers, Saint Petersburg 2018, Apr. 2018, vol. 2018, pp. 1-5, 5 pages.
Smith et al., "Removal and Inhibition of Calcium Sulfate Scale in Waterflood Projects," Journal of Petroleum Technology 20(11): pp. 1249-1256, Nov. 1968, 8 pages.

\* cited by examiner

*Primary Examiner* — Silvana C Runyan
(74) *Attorney, Agent, or Firm* — Osha Bergman Watanabe & Burton LLP

(57) ABSTRACT

Described is a system for targeted waterflooding in an oil field. The system includes a mobile reverse osmosis unit connected with source water. The mobile reverse osmosis unit generates low salinity fresh water from the source water. An injection manifold is connected with the mobile reverse osmosis unit. The injection manifold distributes the low salinity fresh water into injection wells within the oil field. The low salinity fresh water is stored underground prior to its use in production wells.

11 Claims, 4 Drawing Sheets

WATERFLOODING SYSTEM AND PROCESS TO PREVENT SCALE PRECIPITATION IN OIL FIELDS

BACKGROUND

Waterflooding is a process by which oil production is increased by injecting water into injection wells in an oil-bearing reservoir. The injection of water serves to increase the pressure of the reservoir and displace the oil from producing wells, thereby forcing oil to the surface. Scale precipitation is a common problem with waterflooding. In large oil fields, formation brine may be enriched in calcium ions where the concentration may reach, or exceed, a level of saturation. Additionally, using seawater may cause calcium sulfate precipitation. In some oil fields, using water that is incompatible with formation brine is prohibited to avoid further formation damage.

Current processes for preventing scale precipitation include injecting shallow aquifer brines that are low in sulfate and using sources of water other than seawater. Both of these practices rely heavily on water availability. Another waterflooding process involves injecting seawater, or produced water, into large fields through a pipeline network to recover oil from reserves. With this process, treatment and separation methods are often needed to ensure the injected water is compatible with the underground fluids. For oil fields adjacent to a sea, the conventional practice is to reduce sulfate levels in seawater prior to injection. However, in large oil fields, the method may not be cost-effective considering the large volumes of treated water expected to be consumed.

Thus, a continuing need exists for a method of preventing scale precipitation in oil fields that is cost-effective and can be performed in relatively short periods of time.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for targeted waterflooding in an oil field. The system includes a mobile reverse osmosis unit connected with source water. The mobile reverse osmosis unit generates low salinity fresh water from the source water. An injection manifold is connected with the mobile reverse osmosis unit. The injection manifold distributes the low salinity fresh water into injection wells within the oil field. The low salinity fresh water is stored underground prior to its use in production wells.

In another aspect, the fresh water is stored in an underground buffer zone between the plurality of injection wells and the one or more production wells.

In another aspect, the one or more mobile reverse osmosis units are connected with the source water via at least one first pipeline within the oil field, and the injection manifold is connected with the one or more mobile reverse osmosis units via at least one second pipeline.

In another aspect, an inline mixer is positioned in the at least one second pipeline.

In another aspect, the inline mixer is configured for mixing the fresh water with seawater or produced water to generate an injection water, and the injection water is stored underground prior to use in the one or more production wells.

In another aspect, the source water is produced water or seawater.

In another aspect, the plurality of injection wells is distributed in a peripheral injection pattern.

In another aspect, the plurality of injection wells is distributed in a line drive injection pattern.

In one aspect, embodiments disclosed herein relate to a method for targeted waterflooding in an oil field. A target area is identified in the oil field, and one or more mobile reverse osmosis units are positioned proximate to the target area. Source water is then connected to the one or more mobile reverse osmosis units. Fresh water having a salinity lower than the source water is generated from the source water with the one or more mobile reverse osmosis units. The fresh water is injected into one or more injection wells and stored underground prior to use in one or more production wells.

In another aspect, the fresh water is injected into an injection manifold, and the injection manifold distributes the fresh water into the one or more injection wells.

In another aspect, the fresh water is stored in an underground buffer zone between the injection wells and the one or more production wells.

In another aspect, the fresh water is mixed with seawater or produced water to generate injection water.

In another aspect, the injection water is injected into an injection manifold and distributed into one or more of the injection wells with the injection manifold. The injection water is stored underground prior to use in one or more production wells.

In another aspect, the target area is identified by performing a geochemical analysis of ions in the target area.

In another aspect, the geochemical analysis comprises determining a concentration of calcium and a concentration of sulfate.

In another aspect, one or more pipelines that feed the target area with the source water are determined and the one or more pipelines are connected with the one or more mobile reverse osmosis units via a pipeline branch.

In another aspect, one or more samples from a well in the oil field are collected and analyzed to monitor the salinity of the fresh water.

In another aspect, inductively coupled plasma spectrometry is used to analyze the one or more samples.

In another aspect, the salinity of the fresh water is adjusted to avoid scale precipitation.

In another aspect, the salinity of the fresh water is adjusted using various choke valve sizes of an inline mixer.

Other aspects and advantages of the claimed subject matter will be apparent from the following description and the appended claims.

DETAILED DESCRIPTION

Figure 1:
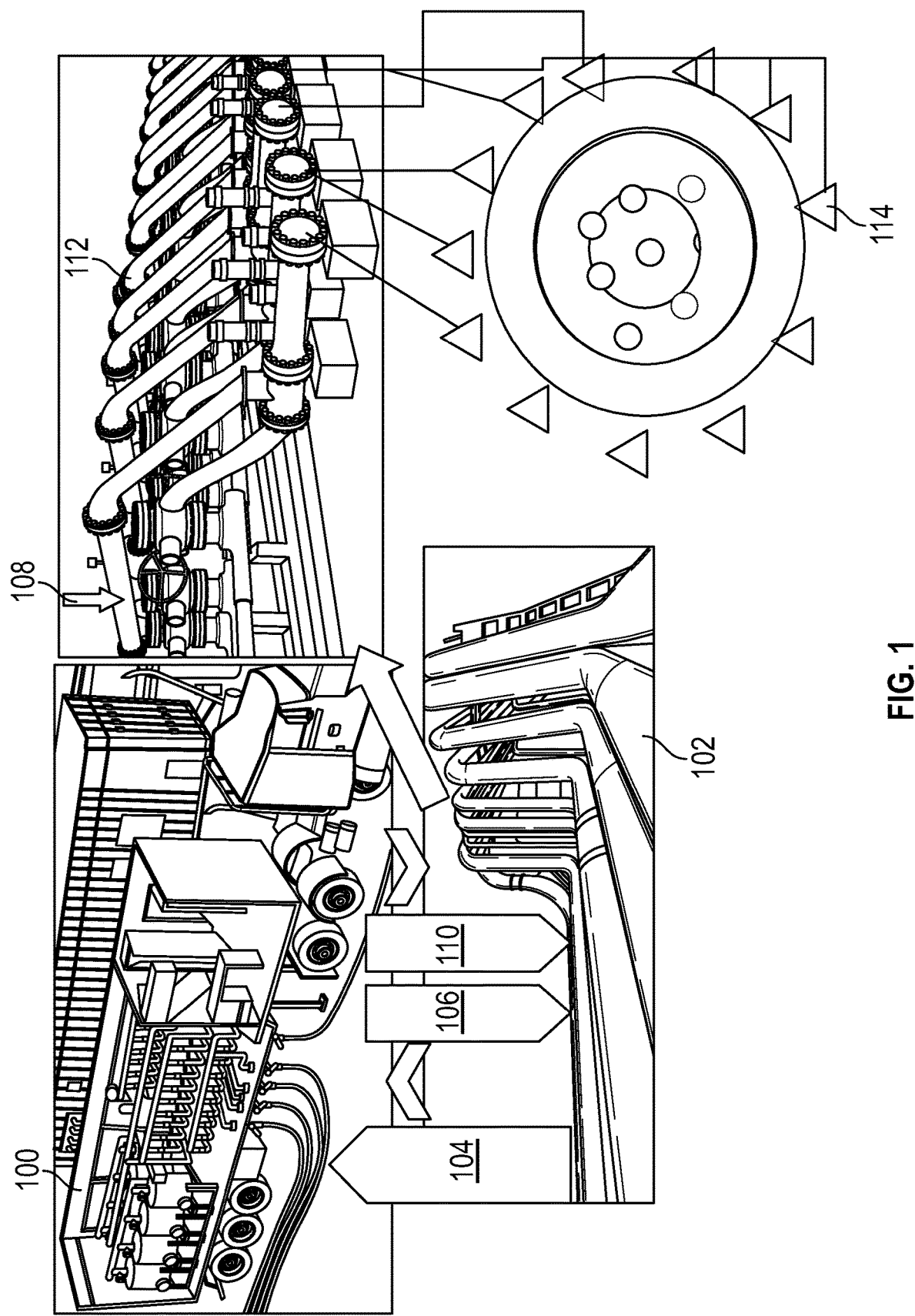
FIG. 1 illustrates components of a targeted waterflooding system according to one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a passive soil gas sample system" includes reference to one or more of such systems.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In one aspect, embodiments disclosed herein relate to a system and process for preventing scale precipitation in oil fields using targeted waterflooding. Fresh water is generated from seawater and/or produced water and used for waterflooding. One embodiment of the targeted waterflooding system is illustrated in FIG. 1. In this embodiment, the targeted waterflooding system includes one or more in-line mobile reverse osmosis units (100) in connection with a set of pipelines (102). The one or more mobile reverse osmosis units (100) may be loaded onto a vehicle and unloaded near targeted oil reservoirs. In this manner, each mobile reverse osmosis unit (100) may be repositioned, as needed, at different areas of an oil field, such as at an edge of an oil field. One or more pipelines in the set of pipelines (102) may carry source water (104) from a water source to the mobile reverse osmosis unit (100). The source water (104) may be seawater when the oil field is near a sea. Alternatively, the source water (104) may be produced water or a mixture of produced water and seawater, or mixed saline water.

Each mobile reverse osmosis unit (100) is configured to convert the source water (104) to fresh water (106) having a lower salinity than the source water. As understood by one skilled in the art, reverse osmosis is a process by which contaminants are removed from water by pushing water through a semi-permeable membrane under pressure. In one or more embodiments, the fresh water (106) is transferred from a mobile reverse osmosis unit (100) to an area underground, referred to as a buffer zone, via the set of pipelines (102). Alternatively, the fresh water (106) may first be mixed with saline water (seawater or produced water) to produce an optimized saline water stream (108). In one or more embodiments, a goal is to avoid precipitating any calcium scale due to fluids incompatibility. For example, to reduce the sulfate concentration of the saline water stream (108) below a predetermined $CaSO_4$ scale threshold level, a mixing ratio of the fresh water and seawater/produced water may be determined and evaluated to meet the targeted ionic composition. The mixing ratio may be dependent upon several factors, such as a distance between the location of the well and the injection manifold. In one or more embodiments, the required mixing ratio is at least 50% fresh water and 50% seawater/produced water.

In one or more embodiments, the fresh water and saline water are mixed with an inline mixer (110) that provides continuous blending of fluids within the pipeline. The fresh water (106) or optimized saline water stream (108), also referred to as mixed water, are then injected into an injection well to initiate the waterflooding process. In one or more embodiments, the fresh water (106) or optimized saline water stream (108) is first transferred to an injection manifold (112). The injection manifold (112) distributes fluid from a single source to multiple outputs, or vice versa. As appreciated by one skilled in the art, an injection manifold (112) is a structure having valves, fitting tubes, pipes, and pressure equipment. As shown in FIG. 1, the injection manifold (112) distributes fluid to multiple injection wells (114) in an oil field. The injection manifold (112) may be formed of any suitable material, such as a corrosive-resistant material (e.g., stainless steel).

Figure 2:
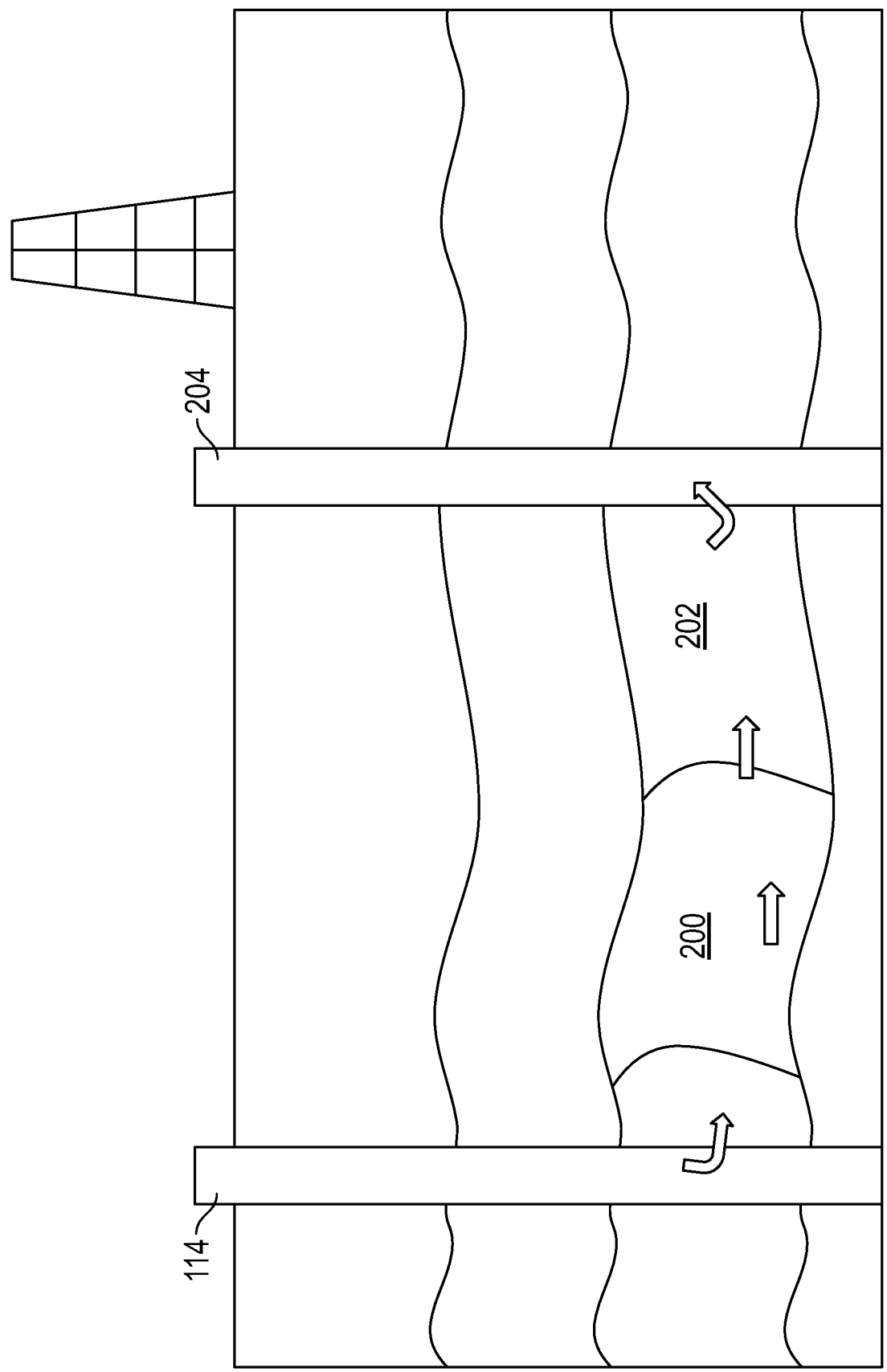
FIG. 2 illustrates an exemplary oil field for targeted waterflooding according to one or more embodiments of the present disclosure.

FIG. 2 depicts an exemplary oil field for targeted waterflooding according to one or more embodiments of the present disclosure. Fluid that is injected into an injection well (114) may be stored downhole, or underground, until a buffer zone (200), or barrier, is formed, which may be pumped later. The buffer zone (200) is created ahead of a formation brine (202), which may be oversaturated with calcium. The buffer zone (200) is comprised of a diluted formation brine that dilutes the calcium concentration in the formation brine (202) to mitigate the formation of calcium sulfate scale downhole. In one or more embodiments, the buffer zone is created using a type of mobile reverse osmosis unit referred to as a reverse osmosis skid unit. The reverse osmosis skid unit may permit a gradual increase in salinity downhole prior to seawater injection.

The salinity of the injection water may be manipulated or adjusted. For instance, the salinity may be increased gradually by adjusting various choke valve sizes of an inline mixer until there is enough of a buffer zone to avoid scale precipitation. For instance, samples of the injection brine may be collected at multiple time points to measure the salinity of the fluid and ensure the salinity of the injection fluid does not exceed a predetermined threshold value associated with scale precipitation. For instance, at the well site, salinity may be monitored remotely via in-line salinity meters using microwave sensor technology. For individual ions, monthly samples may be collected to monitor sulfate and calcium concentrations using inductively coupled plasma (ICP) spectrometry techniques. Additionally, other sensor technologies, such as solid-state selective electrodes, may be used to provide in situ individual ion measurements.

The formation brine (202) displaces the oil from a producing well (204), thereby forcing oil to the surface. The formation brine (202) is formulated and prepared for the conditions of an individual well. For instance, the formation brine (202) may contain any combination of sodium chloride, calcium chloride, potassium chloride, zinc, bromide, and iodine salts.

Figure 3:
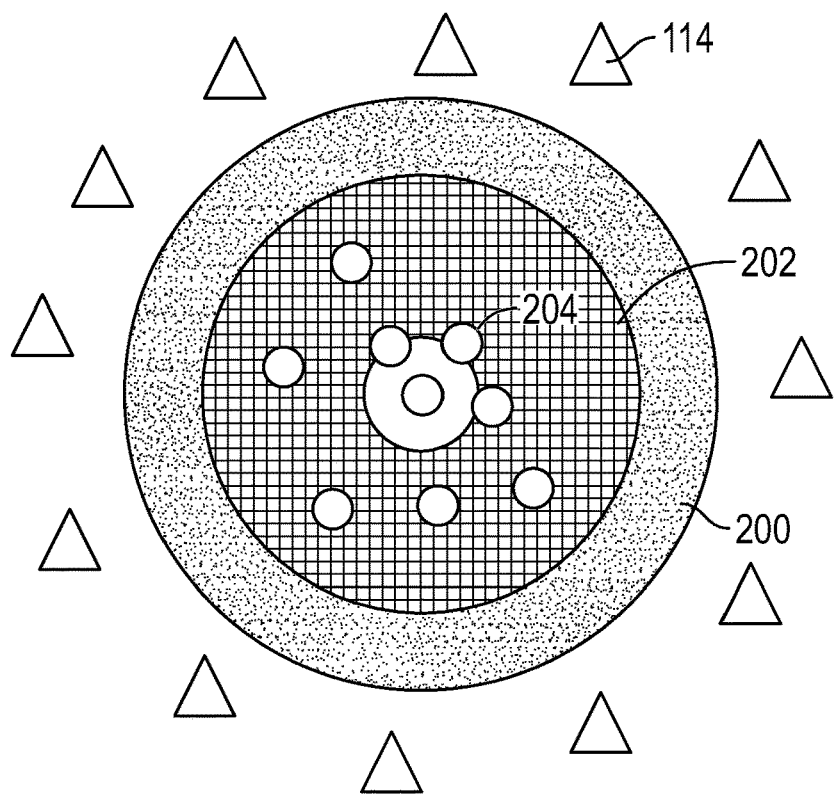
FIG. 3 illustrates a peripheral injection pattern of a targeted waterflooding system according to one or more embodiments of the present disclosure.
Figure 4:
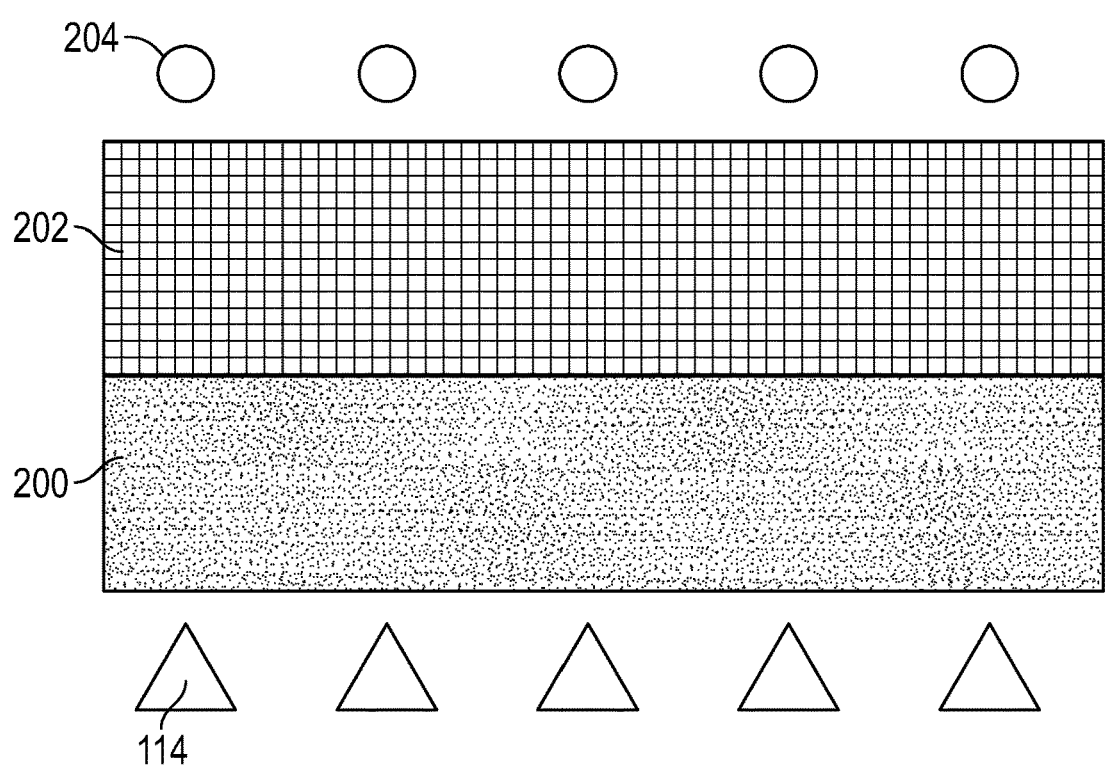
FIG. 4 illustrates a line drive injection pattern of a targeted waterflooding system according to one or more embodiments of the present disclosure.

FIG. 3 illustrates an exemplary arrangement of injection and production wells for a targeted waterflooding system according to one or more embodiments of the present disclosure. In the embodiment shown in FIG. 3, the injection wells are distributed in a peripheral injection pattern, where injection wells (114) are located at the periphery of multiple producing wells (204). The formation brine (202) and buffer zone (200) are arranged at the periphery of the producing wells (204). Alternatively, the injection pattern may also be a line drive injection pattern, where the injection wells (114) are located in a straight line parallel to the production wells (204), as shown in FIG. 4.

Figure 5:
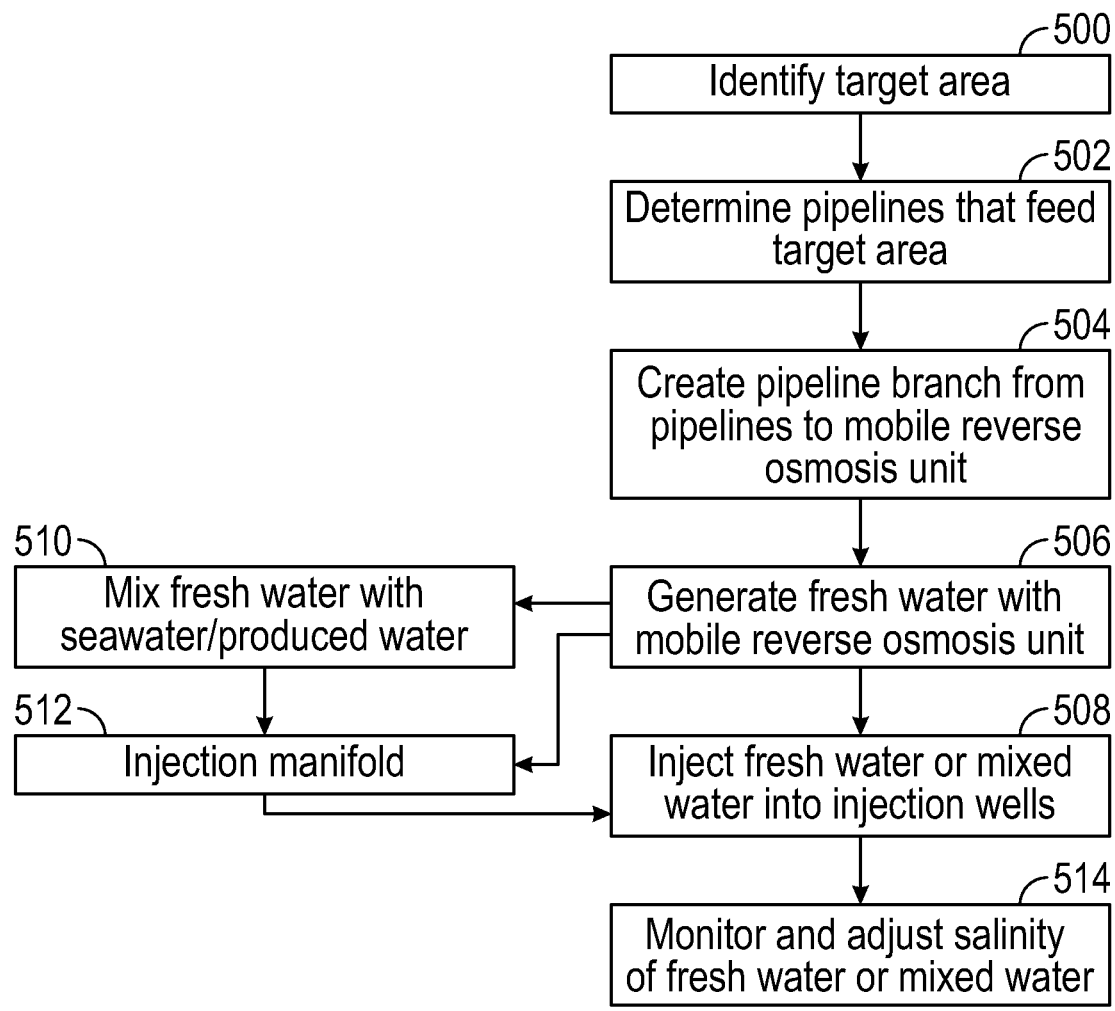
FIG. 5 is a flow diagram depicting a target injection process according to one or more embodiments of the present disclosure.

FIG. 5 is a flow diagram depicting a target injection process according to one or more embodiments of the present disclosure. The target injection process is summarized in the following steps. In step (500), a target area in an oil field may be identified by monitoring the geochemical analysis of ions, such as determining calcium and sulfate concentrations. For instance, produced water from a reservoir may be collected at the wellhead and analyzed using inductively coupled plasma mass spectrometry (ICP-MS). Once the target area is identified, the pipeline (or pipelines) that feeds the target area with seawater or produced water is determined in step (502). The one or more mobile reverse osmosis units are then positioned proximate to the target area. In step (504), a pipeline branch to feed the one or more mobile reverse osmosis units may be created. Fresh water is generated from the mobile reverse osmosis unit in step (506), and the fresh water is injected into the oil field via one or more injection wells in step (508). In one or more embodiments, the fresh water is mixed with seawater or produced water, if compatible, with an inline mixer positioned in a pipeline using various choke valve sizes to adjust the mixing ratios in step (510). The mixed water or fresh water may be injected into an injection manifold in step (512), if used, which distributes the mixed water or fresh water into select injection wells. To determine whether the fresh water should be mixed with seawater or produced water, scaling tendency is estimated. Scaling tendency and prediction may be determined using a conventional industrial software, such as ScaleSoftPitzer™, which predicts scale formation for different minerals (e.g., carbonates, sulfates, sulfides, silicates, calcium fluoride). The injection water (fresh water or mixed water) from at least one well in the oil field may be monitored and adjusted, if needed, in step (514) by collecting fluid samples from the well.

The targeted waterflooding system and method according to one or more embodiments of this disclosure include several advantages. As described above, through the use of mobile reverse osmosis units, an underground buffer zone between formation water and injected seawater may be created at different locations in an oil field. The targeted waterflooding system and method address scale challenges in large and gigantic oil fields without the need for a permanent desalination plant that may require significant piping infrastructure. The mobile reverse osmosis units have more flexibility to inject from multiple locations in the field, especially in a peripheral water injection field. Additionally, the mobile reverse osmosis units are able to be easily set up in target areas of an oil field in a short period of time. The salinity of the injection water may be monitored and controlled (adjusted) by collecting and analyzing the composition of samples of the injection water from offset wells. Thus, the salinity of the injection water may be manipulated and increased gradually until there is enough of a buffer zone to avoid scale precipitation.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A method for targeted waterflooding in an oil field, comprising:
    identifying a target area in the oil field, the target area having a plurality of injection wells located at the periphery of a plurality of production wells;
    positioning a plurality of mobile reverse osmosis units at various locations of the target area;
    connecting source water to each of the plurality of mobile reverse osmosis units;
    generating, at each mobile reverse osmosis unit, fresh water from the source water, the fresh water having a salinity lower than the source water;
    transferring, via one or more pipelines, the fresh water from each mobile reverse osmosis unit to the plurality of injection wells;
    injecting the fresh water underground via the plurality of injection wells;
    creating an underground buffer zone of diluted formation brine at the periphery of each producing well; and
    storing the fresh water in the underground buffer zone prior to use in one or more production wells.

2. The method of claim 1, wherein transferring the fresh water to the plurality of injection wells comprises injecting the fresh water into an injection manifold, wherein the injection manifold distributes the fresh water into the plurality of injection wells.

3. The method of claim 1, further comprising mixing the fresh water with seawater or produced water to generate injection water.

4. The method of claim 3, further comprising:
injecting the injection water into an injection manifold;
distributing the injection water into one or more of the plurality of injection wells with the injection manifold; and
storing the injection water underground prior to use in the one or more production wells.

5. The method of claim 1, wherein the target area is identified by performing a geochemical analysis of ions in the target area.

6. The method of claim 5, wherein the geochemical analysis comprises determining a concentration of calcium and a concentration of sulfate.

7. The method of claim 1, further comprising
connecting one or more pipelines that feed the target area with the source water with the one or more mobile reverse osmosis units via a pipeline branch.

8. The method of claim 1, further comprising collecting and analyzing one or more samples from at least one well in the oil field to monitor the salinity of the fresh water.

9. The method of claim 8, wherein inductively coupled plasma spectrometry is used to analyze the one or more samples.

10. The method of claim 8, further comprising adjusting the salinity of the fresh water to avoid scale precipitation.

11. The method of claim 10, wherein the salinity of the fresh water is adjusted using various choke valve sizes of an inline mixer.

* * * * *